C. L. DAVIS.
ACTION FOR PIANO PLAYERS.
APPLICATION FILED JULY 27, 1905.
1,169,131. Patented Jan. 25, 1916.
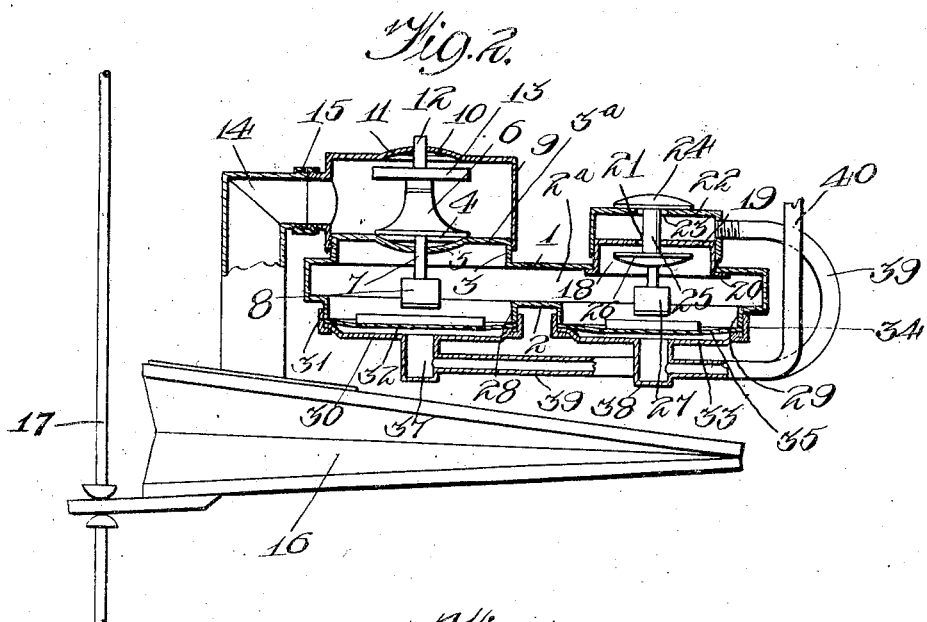
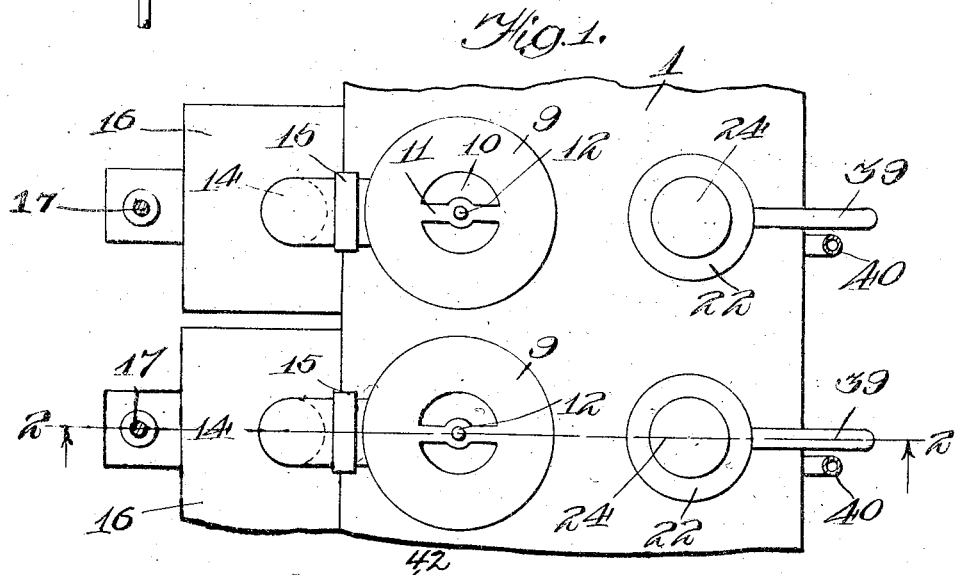
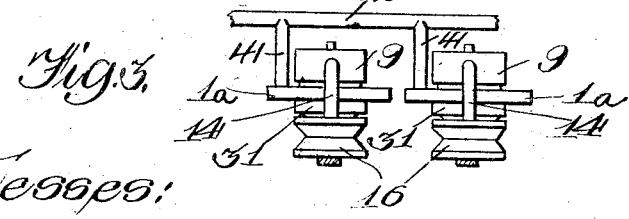
Witnesses:
M. Duplessis
J. C. Lee
Inventor:
Charles L. Davis
by A. Miller Bayfield
Atty.

UNITED STATES PATENT OFFICE.

CHARLES L. DAVIS, OF DETROIT, MICHIGAN, ASSIGNOR, BY MESNE ASSIGNMENTS, TO A. MILLER BELFIELD AND JOHN P. MENTZER, TRUSTEES, OF CHICAGO, ILLINOIS.

ACTION FOR PIANO-PLAYERS.

1,169,131.

Specification of Letters Patent.

Patented Jan. 25, 1916.

Application filed July 27, 1905. Serial No. 271,408.

*To all whom it may concern:*

Be it known that I, CHARLES L. DAVIS, a citizen of the United States, residing at Detroit, in the county of Wayne and State of Michigan, have invented a certain new and useful Improvement in Actions for Piano-Players, of which the following is a full, clear, concise, and exact description, reference being had to the accompanying drawings, forming a part of this specification.

My invention relates to pneumatic actions for mechanical piano players and similar instruments.

The principal object of the invention is, to provide a simple, practical and effective form of pneumatic action which shall be air-tight.

The action which I show herein is made of metal, and is so constructed that the metallic parts can be firmly and tightly secured together and thereby secure the desired impermeability to air.

In the accompanying drawings, Figure 1 is a plan view of a portion of an action embodying my present invention; Fig. 2 is a cross section taken on line 2—2 in Fig. 1; Fig. 3 is a modified form of the invention.

Referring first to Figs. 1 and 2 the action which I show herein comprises upper and lower flat plates 1 and 2 which are extended across the player or other instrument containing the action, to any desired extent or length. These two pieces or plates are secured tightly together so as to form an airtight compartment 2ª, serving as a chamber or duct for the air. Both these pieces are desirably of sheet metal of any desired kind. The upper plate 1 is provided with a series of circular projections 3, 3 whose tops 3ª, 3ª, are provided with central openings or apertures 4, 4, the tops 3ª being adapted to form valve seats, and the openings 4 being provided with bridges 5 having apertures for the valve stems. Mounted upon the tops 3ª which form valve seats, are valves 6, 6 adapted to close the openings 4, 4 and provided with stems 7, 7, and extended through the apertures in the bridges 5, 5. The valve stems 7, 7, are provided with terminal fittings 8, 8. Mounted upon the projections 3, 3, which may be formed by stamping them from the plate 1, are annular metal hoods or caps 9, 9 which are securely and tightly fastened to the projections 3, 3, as for example by threading said projections and said hoods. The tops of the hoods 9 are provided with apertures 10 containing bridges 11, 11 which serve as supports and guides for the upper ends 12 of the valve spindles. The valves 6 are also provided with flat valve plates 13 adapted to close the apertures 10. From the hoods 9 are extended metal pipes 14, 14 connected with the heads 9 by threaded metallic collars 15. These pipes 14 extend down to and are connected with pneumatics 16, 16 which are located at intervals below the pneumatic duct formed by the plates 1 and 2. These pneumatics are of any suitable form and shape, and are provided with connections 17 by which they operate parts of the instrument as desired. The upper plate 1 is also provided with apertures into which are fitted metallic thimbles 18. These thimbles 18 are desirably arranged to screw into said apertures from below, and are provided with flanges 20 adapted to come in contact with and make a tight fit with the plate 1. The tops 19 of thimbles 18 are provided with central apertures 21. Upon each thimble 18 is a metal hood or cap 22 secured to the thimbles 18 preferably by screwing it upon the same. This cap 22 has a central aperture 23, and is provided with a valve 24 adapted to close the aperture 23. The valve stem 25 of this valve extends down through the apertures 23 and 21 and carries a lower valve 26 and also a terminal 27.

The lower plate 2 is provided with circular rims or flanges 28 and 29 located respectively below the valve mechanisms above described. A metal cap 30 is secured below the rim 28 by a metallic rim 31, and a leather pouch 32 is located above the cap 30 and secured in place by having its edges clamped between the edge of the rim 30 and the bottom of the rim 28. In a similar way the cap 33 is secured by a ring 34 to the rim 29 with pouch 35 between them. The pouch 32 is adapted to act upon the terminal 8 and the pouch 35 upon the terminal 27. The cap 30 is provided with a socket 37 and the cap 33 with a socket 38. A tube 39 extends from the socket 37 to the cap 22. Another tube 40 extends from the socket 38 up to the tracker board.

The operation of the device is as follows: The air on entering a tracker board tube 40, passes into the chamber formed by the socket 38 and lifts the pouch 35. This acts upon the puppet valve spindle 25, elevating the same and causing the valve 26 to rise and close the port 21 and the valve 24 to open the port 23, thereby permitting the outside air to have access to the tube 39. This air traverses said tube and enters the chamber formed by the socket 37, thereby causing the pouch 32 to rise and lift the valve 6. This closes the port 10 and opens the port 4, thereby throwing the interior of the hood 9 into communication with the vacuum chamber formed by the plates 1 and 2, whereupon the air is instantaneously exhausted from said tube and pipe 14 and pneumatic 16, thereby causing the pneumatic to collapse and operate.

It will be seen that all parts of the action being metal and being screwed firmly together, form an absolutely air-tight action which will prevent trouble by leakage of air.

In Fig. 3 I have shown the action so constructed as to permit the separate valve mechanisms and pneumatics to be bodily removed. In this arrangement I have shown separate boxlike structures 1ª, 1ª which correspond to the chamber formed by the upper and lower plates 1 and 2 of Figs. 1 and 2. These boxlike structures 1ª, 1ª are connected by tubes 41, 41 with a long tube or duct 42 which runs to or is connected with the wind-inducing apparatus of the instrument. The other parts of the apparatus are the same. Thus in this arrangement a condition of exhaust is maintained in the separate boxes 1ª, 1ª, so that the valve mechanisms operate as in the previously described arrangement. The tubes 41, 41 are detachably connected with the boxes 1ª, 1ª, so that the latter with their valves and pneumatics, can be separately and bodily removed to be replaced and repaired.

It will be understood that changes and modifications can be made without departing from the spirit of my invention.

What I claim is:—

1. A pneumatic piano player action, comprising a casing forming a pneumatic trunk and adapted for connection with the wind-inducing apparatus, primary and secondary valve casings mounted on the top of and having threaded connection with said casing and provided with primary and secondary valves, primary and secondary pouch boards hung below said casing, a tracker board tube connected with the primary pouch board, and a tube connection running from the primary valve casing to the secondary pouch board.

2. A pneumatic piano player action, comprising a casing forming a pneumatic chamber, primary and secondary valve casings mounted upon said first mentioned casing and provided with primary and secondary valves, the said first-mentioned casing forming the valve seat for the secondary valve, and the primary casing forming the valve seat for the primary valve, primary and secondary pouch boards hung from the lower side of said first mentioned casing, a tracker board tube running to the primary pouch board, and a tube connection extending from the primary valve casing to the secondary pouch board.

3. A pneumatic action, comprising a pneumatic chamber adapted for connection with the wind-inducing apparatus, primary and secondary valve casings mounted detachably upon the top of said chamber, a primary valve supported by the primary valve casing, a secondary valve located within the secondary valve casing, pouches below said valves, pouch boards below said pouches, detachable rings for detachably connecting the pouch boards with said pneumatic casing, and a tube extending from the primary valve casing to the secondary valve pouch board.

4. A pneumatic action, comprising a casing forming a pneumatic chamber for connection with the wind-inducing apparatus, primary and secondary valve casings mounted upon and having screw-threaded connection with the top of said pneumatic chamber casing, a primary valve supported by said primary valve casing, a secondary valve inclosed within the secondary valve casing, pouches below said valves, pouch boards below said pouches, threaded rings having screw-threaded connections with said pneumatic chamber casing, and a tube connection between the primary valve casing and the secondary pouch board.

5. A pneumatic action, comprising a casing providing a chamber for connection with the wind-inducing apparatus, a thimble 18 for the primary valve, said thimble having a screw-threaded connection with said casing, a cap 22 having a threaded connection with the thimble 18, a primary valve puppet having valves 24 and 26, the upper one of which rests upon the top of the cap 22 and the lower one of which is located below the top 19 of the thimble 18, a secondary valve casing 9 having a threaded connection with the casing formed in said pneumatic chamber, a secondary valve 6 located in said casing 9, pouches 32 and 35 below said valves, pouch boards 30 and 33 below said pouches, rings 31 and 34 having threaded connections with the casing forming said pneumatic chamber and supporting said pouch boards, a tube connection 39 extending between the cap 22 and pouch board 30, a tube 40 extending from the pouch board 23 to the tracker board, and a power pneumatic tube connection 14.

6. A pneumatic action, comprising a casing forming a pneumatic trunk and adapted for connection with the wind-inducing apparatus, primary and secondary valve hoods or caps mounted on top of and having threaded connection with said casing, primary and secondary valves carried by said hoods or caps, pouch boards mounted below the valves and supporting the pouches, a tube connection between the primary valve hood and the secondary pouch board, and a separable connection for said pneumatic chamber casing, whereby the same can be bodily detached and removed.

7. In a pneumatic action, the combination with a casing providing a pneumatic chamber, of a thimble 18 extending up through the casing, a cap 22 fitted to the thimble 18, and a valve stem 25 having valves 24 and 26, the former above the cap 22 and the latter below the top 19 of the thimble 18.

8. In a pneumatic action, the combination with a casing providing a pneumatic chamber, of a thimble 18 extended through the wall of said chamber and having a threaded connection therewith, said thimble being provided with flanges 20, a cap 22 having a threaded connection with the thimble 18, and a valve stem 25 extending through apertures in the cap 22 and top 19 of the thimble 18, said stem being provided with valves 24 and 26, whereof the valve 24 rests upon the cap 22 and the valve 26 is located below the top 19 of the thimble 18.

9. In a pneumatic action, the combination of a casing providing a pneumatic chamber, of a projection 3ª formed from said casing, and a hood 9 fitted to the projection 3ª and containing a valve which is seated upon said projection.

10. In a pneumatic action, the combination of a casing providing a pneumatic chamber, the wall of said casing being provided with a projecting rim 3 having a top 3ª, a hood 9 having a threaded connection with the rim 3, and a valve 6 seated upon the top 3ª.

11. In a pneumatic action, the combination of a metal casing forming a wind trunk and having an annular projection 28 formed from the metal comprising the bottom of said casing and projecting downwardly from said bottom, a pouch holding disk arranged below said annular projection, a pouch having its edge located between said annular projection and said pouch disk, and a ring 31 having sides which extend up the outside of said annular projection and have a screw threaded connection with the same, said ring also having a flange which extends laterally so as to come below the outer annular edge of said pouch disk to engage and hold the same in position.

12. A pneumatic action comprising a tubular casing providing a windway, a valve support comprising a thimble detachably connected with the top of said windway, and a cap mounted upon and detachably connected with said thimble.

13. A pneumatic action comprising a tubular casing providing a windway, and a valve-holding mechanism comprising a projection formed on the top of said casing and a valve hood or cap mounted upon and detachably connected with said projection.

14. A pneumatic action comprising a tubular casing providing a windway, primary valve-holding mechanism consisting of a thimble detachably connected with the top of said casing and a cap or hood mounted upon said thimble and detachably connected therewith, and a secondary valve-holding mechanism consisting of an annular projection formed in the top of said casing and a valve-holding hood or cap mounted upon and detachably connected with said annular projection.

15. A pneumatic action comprising a tubular casing providing a windway, primary valve-holding mechanism consisting of a thimble detachably connected with the top of said casing and a cap or hood mounted upon and detachably connected with said thimble, a secondary valve-holding mechanism consisting of an annular projection formed in the top of said casing and a valve-holding hood or cap mounted upon and detachably connected with said annular projection, and primary and secondary pouch-holding devices detachably supported below said primary and secondary valve mechanisms, said pouch-holding devices being arranged below openings formed in the bottom of said windway casing and being provided with pouches.

16. A pneumatic action comprising a tubular casing providing a windway, primary valve-holding mechanism consisting of a thimble detachably connected with the top of said casing and a cap or hood mounted upon and detachably connected with said thimble, a secondary valve-holding mechanism consisting of an annular projection formed in the top of said casing and a valve-holding hood or cap mounted upon and detachably connected with said annular projection, primary and secondary pouch-holding devices detachably supported below said primary and secondary valve mechanisms, said pouch-holding devices being arranged below openings formed in the bottom of said windway casing and being provided with pouches, and primary and secondary valves in said primary and secondary valve-holding mechanisms.

17. A pneumatic action comprising a tubular casing forming a wind trunk, primary and secondary valve casings mounted on top of said wind trunk, pouch-holding devices and pouches carried by the bottom of said wind trunk, and tubes or pipes forming pneumatic connections between the primary valve casings and the secondary pouch-holding devices and extended laterally from said primary valve casings around the edge of the wind trunk and down underneath the same to the pouch-holding devices.

18. A pneumatic action comprising a tubular casing providing a trunk, primary and secondary valve casings mounted on and having threaded connections with said trunk casing, pouch-holding devices carried by the bottom of said trunk casing below said valve casings, valves carried by the valve casings, pouches carried by the pouch-holding devices, and tubes or pipes extending between the primary valve casings and the secondary pouch-holding devices.

19. A pneumatic action comprising a tubular casing providing a wind trunk, primary and secondary valve casings detachably secured to the top of the wind trunk, pouch-holding devices and pouches detachably secured to the bottom of the wind trunk, said pouch-holding devices comprising pouch plates and independent rings having threaded connections with the bottom of the wind trunk, and tubes or pipes extending between the primary valve casings and the secondary pouch plates and connected with the same.

20. A pneumatic action comprising a tubular casing providing a wind trunk, primary and secondary valve casings having threaded connection with the top of said wind trunk and arranged in rows along the same, pouch-holding disks and pouches below said valve casings; threaded rings having threaded connection with the bottom of the wind trunk and engaging the pouch plates to hold the same in position, and tubes or pipes extending between the primary valve casings and the secondary pouch-plates.

21. A pneumatic action comprising a tubular casing providing a windway, primary and secondary valve casings having threaded connections with the top of said windway casing, and pouch-holding devices detachably secured to the bottom of said casing.

22. A pneumatic action comprising a tubular casing providing a windway, primary and secondary valve casings having threaded connections with the top of said windway casing, and pouch-holding devices having threaded connections with the bottom of said casing.

23. A pneumatic action comprising a tubular casing providing a windway, primary and secondary valve casings having threaded connections with the top of said windway casing, and pouch-holding devices having threaded connections with the bottom of said casing, in combination with valves and pouches.

24. A pneumatic action comprising a tubular casing providing a windway, a valve support comprising a thimble having a threaded connection with the top of said windway casing, and a cap having a threaded connection with said thimble.

25. A pneumatic action comprising a tubular casing providing a windway, and a valve-holding mechanism comprising a projection formed on the top of said casing and a valve hood or cap having a threaded connection with said projection.

26. A pneumatic action comprising a tubular casing providing a windway, a primary valve-holding mechanism consisting of a thimble having a threaded connection with the top of said casing and a cap or hood having a threaded connection with said thimble, and a secondary valve-holding mechanism consisting of a projection formed on the top of said casing and a valve-holding hood or cap having a threaded connection with said projection.

27. A pneumatic action comprising a tubular casing providing a windway, primary valve-holding mechanism consisting of a thimble having a threaded connection with the top of said casing and a cap or hood having a threaded connection with said thimble, a secondary valve-holding mechanism consisting of a projection formed in the top of said casing and a valve-holding hood or cap having a threaded connection with said projection, and primary and secondary pouch disks detachably supported below openings formed in the bottom of said windway casing below said valve-holding mechanisms.

28. A windway casing for pneumatic actions, having its top provided with an aperture for the primary valve-holding device, and also provided with a formed-up projection for the secondary valve-holding device, and having its bottom provided with two apertures for pouches.

29. A windway casing for pneumatic actions, having its top provided with an aperture for the primary valve-holding device, and also provided with a formed-up portion for the secondary valve-holding device, and having its bottom provided with two apertures for pouches, formed by downwardly extending rims.

30. The combination of a wind trunk, a series of primaries and a series of secondaries, said primaries and secondaries being arranged in rows directly upon the top of the wind trunk and both being served by the same, and pneumatic connections between the primaries and secondaries.

31. A windway casing for pneumatic actions whose top is provided with an integrally formed upwardly projecting cap portion whose top forms a valve seat, and having its bottom provided with a downwardly extending integrally formed annular rim forming an aperture for a pouch.

32. A windway casing for pneumatic actions, having its top provided with annular formed-up projections forming valve seats and its bottom provided with downwardly extending annular projections, valve caps having threaded connections with said top projections, and pouch disks detachably secured below said bottom annular projections.

33. A pneumatic action comprising a tubular casing providing a windway, primary valve-holding devices mounted detachably on the top and along one side of said casing, secondary valve-holding devices detachably mounted on the top and along the other side of said casing, primary and secondary pouch-holding devices detachably secured to the bottom of said casing below said primary and secondary valves, pouches carried by said pouch-holding devices, and tubular connections between the primary valve casings and the secondary pouch-holding devices.

34. A pneumatic action, comprising primary and secondary valve mechanisms arranged in rows, said mechanisms comprising valve-holding and pouch-holding devices detachably held in place and a common wind trunk on which both said primary and secondary valve mechanisms are mounted, and tubular connections between the primary valve-holding devices and the secondary pouch-holding devices.

35. A pneumatic action comprising primary and secondary valve mechanisms, said valve mechanisms comprising detachably connected valve-holding casings and detachably connected pouch-holding disks, a common windway communicating with both the primary and secondary valve-holding casings, tubular connections between the primary valve casings and the secondary pouch-holding disks, and primary and secondary valves.

36. The combination of a hollow metal casing forming a wind trunk, metallic valve casings detachably secured to said wind trunk casing, pneumatics located below said casing and tubes connected with said valve casings and extended down at one side of the wind trunk casing, said pneumatics being connected to and suspended from the lower ends of said tubes and extending underneath the wind trunk casing.

37. A metallic wind-trunk casing for pneumatic actions having a projection formed on its top of the material of which the top is composed, said projection being adapted to form a valve seat, and a valve casing having a threaded connection with said projection, a pouch below the valve casing, said wind trunk casing having an aperture for said pouch, and a detachably secured pouch-holding device arranged below said pouch for holding same in position.

38. A windway casing for pneumatic actions, in combination with a pair of members detachably connected with the top of said windway casing and providing a valve seat and chamber, a valve mounted upon the upper one of said members and within the other, a pouch-holding device detachably connected with the bottom of said chamber, and a pouch held by said pouch-holding device.

39. The combination of a pneumatic casing having its top provided with a valve opening, a hood mounted upon and having threaded connection with said casing, and covering said valve opening therein, said hood having an air opening, and a valve seated on said casing and controlling the valve opening thereof, and also controlling the air-opening of said hood.

40. A casing forming a wind-trunk, a series of valve openings along the top of said casing, valves for said openings seated upon said casing, and hoods inclosing said valves and having threaded connections with said casing, said hoods having air-openings controlled by said valves.

41. A pneumatic casing forming a wind-trunk, a thimble detachably connected with the top of said casing, a cap detachably connected with said thimble, a valve seated upon said cap, and a pneumatic connection with said cap communicating with the interior thereof.

42. A casing forming a wind-trunk and having its top provided along one side with a series of valve seats and valve-openings, and provided along the other side with a series of openings for valve casings.

43. The combination of a hollow metal casing forming a wind trunk, metallic valve casings detachably secured to said wind trunk casing, pneumatics located below said casing and tubes connected with said valve casings and extended down at one side of the wind trunk casing, said pneumatics being connected to and suspended from the lower ends of said tubes and extending underneath the wind trunk casing, valves in said valve casings and diaphragms for actuating said valves, said diaphragms being located within said wind trunk casing.

44. The combination of a tubular metallic casing serving as a wind trunk, primary and secondary valve casings mounted upon and carried by the same side of said casing, pouch holding devices for said primaries and secondaries, said pouch holding devices being mounted upon and carried by the side of said tubular casing opposite the valve casings, tracker board tubes running to the primary pouch holding devices, and tubular connections extended between the primary valve casings and the secondary pouch holding devices.

45. The combination of a casing forming a wind-trunk, two sets of valve-mechanisms arranged in rows along and mounted upon the same side of said casing, and communicating with one and the same wind-trunk formed by the casing, and pneumatic connections for said valve-mechanisms.

46. The combination with a casing forming a wind trunk, of primaries and secondaries mounted on the top of said wind trunk and served by the same, and power pneumatics also served by said wind trunk.

47. The combination with a metallic casing forming a wind-trunk of a cylindric valve casing having an open end which is internally threaded and has a screw threaded connection with said wind-trunk casing.

48. The combination of a metallic casing forming a wind-trunk, a cylindric projection projecting from one wall of said wind trunk, and a metallic valve casing having a cylindric open end which is internally screw threaded and has a screw threaded connection with said projection on said wind trunk casing.

49. The combination of a metallic casing forming a wind trunk, a metallic valve casing having a cylindric open end which is internally screw threaded and has a screw threaded connection with one side of the wind trunk casing, a metallic pouch disk, and means for hanging said pouch disk detachably upon the side of said wind trunk casing opposite said valve casing.

50. The combination of a tubular casing forming a wind trunk, of valve casings mounted upon said wind trunk, metallic tubular members detachably connected to said valve casings and striking pneumatics secured to and supported by said tubular members.

51. The combination of a tubular casing forming a wind trunk, valve casings mounted upon said tubular casing, tubular members detachably secured to said valve casings and extended downwardly at one side of the wind trunk casing, and striking pneumatics secured to the lower ends of said tubular members and extended under said wind trunk casing.

52. The combination of a tubular casing forming a wind trunk, valve casings detachably secured to said wind trunk, tubular members detachably secured to said valve casing, and extending downwardly at one side of the wind trunk, and power pneumatics secured to and supported by said tubular members.

53. The combination of a tubular casing forming a wind trunk, valve casings detachably secured to said wind trunk, tubular members detachably secured to said valve casing, and extending downwardly at one side of the wind trunk, and power pneumatics secured to and supported by said tubular members and extended under said wind trunk casing.

54. The combination of a tubular casing forming a wind trunk, striking pneumatics, and tubular members extending to said striking pneumatics to afford wind passages from the same to the wind trunk casing, said tubular members also forming means for detachably supporting said pneumatics.

55. The combination of a tubular casing forming a wind trunk, striking pneumatics arranged underneath said casing, tubular members forming supports for said pneumatics and means for detachably connecting said tubular members with said wind trunk casing.

56. The combination of a tubular casing forming a windway, power pneumatics arranged below said casing, tubular members extending upwardly from said pneumatics at one side of said windway casing and thence horizontally above said windway casing, and valve casings mounted upon said windway casing and connected with the ends of said tubular members.

57. The combination of a tubular casing forming a wind trunk, valve casings detachably secured to said wind trunk casing, and power pneumatics detachably secured to said valve casings.

58. The combination of a tubular metallic casing forming a wind trunk, metallic valve casings detachably connected with said wind trunk casing, and power pneumatics located underneath said wind trunk casing and detachably connected with the same.

59. The combination of a tubular metallic casing forming a wind trunk, metallic valve casings detachably connected with metallic tubular members which are extended downwardly from said valve casings.

60. The combination with a wind trunk casing of a valve casing associated therewith and communicating with the interior of said wind trunk casing, said valve casing having a partition between its top and bottom, said partition being provided with an aperture or port and said valve casing also having an aperture or port in its top, a valve located in said casing between the top thereof and said partition and arranged to open and close the ports in said top and partition, the portion of said valve casing below said partition communicating with said wind trunk casing, and a striking pneumatic and tube therefor, said tube communicating with the portion of said valve casing between the top thereof and the partition therein.

61. The combination of a wind trunk casing, of a valve structure therefor above said casing, a tube running from said valve structure and also above said casing, and a striking pneumatic underneath said casing supported by said tube.

62. The combination of a metallic wind trunk casing and a series of cylindric metallic valve casings mounted upon said wind trunk casing and secured to one side only of the same.

63. The combination of a wind trunk casing, and a series of metallic valve casings mounted upon the top of said wind trunk casing, the lower ends of said valve casings being open and communicating directly with the interior of said wind trunk casing through apertures in the latter.

64. The combination of a wind trunk casing, and a series of metallic valve casings mounted upon the top of said wind trunk casing, the lower ends of said valve casings being open and communicating directly with the interior of said wind trunk casing through apertures in the latter, said valve casings being detachably secured to the top only of said wind trunk casing.

65. The combination with a substantially flat wind trunk casing arranged horizontally in flat wise position, of a series of cylindric valve casings containing valves, said valve casings being detachably secured directly to said wind trunk casing with the valves therein in horizontal planes, pneumatics underneath said wind trunk casing and tubes or pipes connected with the sides of said valve casings and extending therefrom to said pneumatics.

66. The combination of a wind trunk casing, and a structure attached to said casing, said structure having a recessed portion containing a valve and a duct or passage extending downwardly from said recessed portion at one side of the wind trunk casing, in combination with a pneumatic attached to the lower end of said duct or passage portion and extended underneath said wind trunk casing.

67. The combination of a wind trunk casing, a metallic structure comprising a recessed portion containing a valve and having communication with the interior of said wind trunk, and a duct or passage portion extending downwardly from said valve containing portion at one side of the wind trunk casing, said structure being detachably secured to said wind trunk casing, and a pneumatic located at the lower end of said duct or passage portion and communicating therewith, said pneumatic being arranged underneath said structure and said wind trunk casing.

In witness whereof, I hereunto subscribe my name this 20th day of July, A. D. 1905.

CHARLES L. DAVIS.

Witnesses:
CHAS. R. WILMOTH.
CHAS. H. AUSTIN.